United States Patent [19]

Hattori et al.

[11] Patent Number: 4,679,855
[45] Date of Patent: Jul. 14, 1987

[54] SIDE SUPPORT ASSEMBLY

[75] Inventors: Takemi Hattori, Kariya; Reiki Kawamura, Toyota, both of Japan

[73] Assignees: Aisin Seiki Kabushiki Kaisha; Toyota Jidosha Kabushiki Kaisha, both of Aichi, Japan

[21] Appl. No.: 813,821

[22] Filed: Dec. 27, 1985

[30] Foreign Application Priority Data

Dec. 27, 1984 [JP] Japan ................................ 59-196197

[51] Int. Cl.⁴ ...................... B60R 21/10; A47C 31/00
[52] U.S. Cl. ..................................... 297/486; 297/464
[58] Field of Search ................ 297/486, 487, 488, 464

[56] References Cited

U.S. PATENT DOCUMENTS 1,074,615 10/1913 Folmer ................................. 297/464
3,203,733 8/1965 Priest et al. .......................... 297/486
3,466,091 9/1969 Grusso ................................ 297/486
3,764,180 10/1973 Mulholland ......................... 297/486
4,130,318 12/1978 Hemmen ............................ 297/464

Primary Examiner—James T. McCall
Attorney, Agent, or Firm—Burns, Doane, Swecker & Mathis

[57] ABSTRACT

A side support assembly for the seat of an automotive vehicle includes a pair of horizontally swingable side support frames provided on the left and right sides of the seat backrest to support a seated individual from the right and left sides, a connecting rod for swinging the side support frames toward or away from each other, and a locking mechanism for locking the side support frames at a position to which they have been set. The locking mechanism is provided on the connecting rod so that the side support frames will support the seated individual with the same rigidity when the individual is forced against them due to an inertial force produced at cornering.

9 Claims, 2 Drawing Figures

SIDE SUPPORT ASSEMBLY

BACKGROUND OF THE INVENTION

This invention relates to improvements in a side support assembly having side supports provided at the left and right sides of a backrest in order to maintain the posture of an individual occupying a seat in an automotive vehicle, especially a sports car. More particularly, the invention relates to a side support assembly of the type described in which the left and right side supports are swung back and forth to symmetrically adjust their position relative to a seated individual and held at the position to which they have been set.

When the direction in which an automotive vehicle is traveling is changed, an inertial force acts upon the individuals riding in the vehicle. Though the individual may attempt to follow the change in direction by trying to resist the influence of inertia, the inertial forces can be great enough to throw the individual toward the left or right side of the vehicle. If the individual is the driver of the vehicle, such a forcible change in posture can have a deleterious effect upon the ability to steer the vehicle. For this reason, there is a growing tendency for sports cars to come equipped with a side support assembly installed in the driver's seat.

A side support assembly of this type is disclosed in the specification of Japanese Utility Model Kokai Publication No. 57-204942. The disclosed side support assembly includes left and right frames each constituting the structural elements of a side support. Each frame has a freely rotatable operating shaft provided longitudinally of a backrest frame, the shafts being located at the left and right sides of the backrest frame. A connecting rod for rotating the operating shafts back and forth is provided transversely of the backrest and is coupled to the operating shafts at both ends thereof by links in such a manner that the left and right side supports may be swung back and forth horizontally and symmetrically. Means for swinging the frames of the left and right side supports in this manner is directly provided on one of these frames. The swinging means comprises a nut pivotally supported on the frame so as to be capable of swinging back and forth, and a screw shaft threadedly engaged with the nut and supported for free rotation at a prescribed position.

The disclosed side support assembly is not specially provided with a locking mechanism. However, since the operating mechanism of the swinging means is such that turning the screw shaft advances the nut to swing the frames, a force transmitted to the nut from the frames does result in rotation of the screw shaft. Thus, the swinging means doubles as a locking mechanism.

SUMMARY OF THE INVENTION

The present invention is directed to solving certain problems encountered in the conventional side support assembly described above. Specifically, when the driver steers the vehicle so as to change its traveling direction, the inertial force of the driver acts upon the frame of the left or right side support, thus causing the frame to bend. However, since the swinging means swings only one of the frames directly and holds only this one frame at the set position by functioning as a locking mechanism, the left and right frames exhibit a difference in rigidity which the driver can sense with some unease while steering the vehicle. More specifically, when the aforementioned inertial force acts upon the frame provided with the locking mechanism, the force is received directly by the locking mechanism and, hence, the frame as a whole has a comparatively high degree of rigidity (resistance). When the inertial force acts upon the other frame, however, the force is transmitted to the locking mechanism via the link that rotates the operating shaft of this frame, the connecting rod and the link on the side of the locking mechanism, in the order mentioned. Moreover, the path along which the force is transmitted has play at two points, namely at the points where the connecting rod is joined to the links at either end, and the connecting rod itself is elastically deformable. For these reasons, the frame devoid of the locking mechanism exhibits little rigidity (resistance). As a result, the conventional side support assembly has left and right frames of unbalanced rigidity (resistance), thus forming a seat which does not offer balanced side support for the driver to assist his steering. Furthermore, since the swinging means and locking mechanism are provided on one of the frames constituting the structural framework of the corresponding side support, a limitation is placed upon freedom of design. This constitutes an obstacle encountered in the designing of the seat.

Accordingly, an object of the present invention is to provide a side support assembly having left and right frames so balanced in terms of rigidity (resistance) as to avoid producing any driver discomfort during steering.

Another object of the present invention is to provide a side support assembly that imposes no restriction upon freedom of design.

According to the present invention, the foregoing objects are attained by providing a side support assembly in which a locking mechanism for locking the left and right side supports at a position to which they have been adjusted is provided on the connecting rod rather than on one of the side frames. Namely, the present invention provides a side support assembly for a seat having a backrest, comprising:

left and right frames swingable horizontally and provided on the left and right sides of the backrest, each frame constituting a side support framework;

a connecting rod provided on the backrest and extending transversely thereof for swinging said left and right frames toward and away from each other; and a locking mechanism provided on said connecting rod for locking said left and right frames at a position to which they have been set.

PREFERRED EMBODIMENTS

In one embodiment of the invention, the locking mechanism serves as swinging means as in the conventional assembly. In another embodiment, the locking mechanism is provided separately of the swinging means, in which case the swinging means includes a spring for biasing the connecting rod in a direction which closes the side supports, namely in a direction which moves the side supports toward each other to provide side support for the driver, and the locking mechanism includes a latch lever. The locking mechanism and the latch lever can be arranged in operative association to enable the side supports to be adjusted and locked in position by a single, simple operation.

In the first embodiment where the locking mechanism also serves as the swinging means, the swinging means is adjusted and, e.g., the screw shaft is turned to swing the frames together with the nut so that the left and right side supports are adjusted to the figure of the seated individual. When this has been accomplished, the side supports will remain locked at the position set. Since the locking mechanism is provided on the connecting rod in accordance with the present invention, the inertia of the seated individual, regardless of whether it acts upon the left or right frame, is applied to the locking mechanism under essentially the same conditions so that both frames offer approximately the same rigidity (resistance).

In the second embodiment of the invention wherein the swinging means includes the spring and the locking mechanism includes the latch lever, the lever is manipulated to allow the left and right side supports to be swung away from each other so that an individual may be seated. After the individual has sit down in the seat, the lever is released to enable the left and right side supports to be swung toward each other under the force applied by the spring. If the lever is released after the side supports have been set to the suitable angle, the side supports will be locked at this angle by the latch lever. As in the first embodiment, the inertia of the seated individual is applied to the locking mechanism under almost the same conditions irrespective of which frame the inertial force acts upon. The two frames therefore exhibit substantially the same rigidity (i.e., resistance to the force developed by the seated body).

ADVANTAGES OF THE INVENTION

According to the present invention, the connecting rod provided on the backrest and extending transversely thereof is provided with a locking mechanism for locking the frames constituting the left and right side supports at a position to which the frames have been adjusted. Such an arrangement balances the rigidity (resistance) of the two frames to eliminate any feeling of unease or discomfort caused by a difference in rigidity which would otherwise develop between the two side supports. Furthermore, since the locking mechanism is provided on the connecting rod provided transversely of the backrest, there is greater freedom of design. This allows the padding provided in the side support assembly to be reduced in thickness, or affords space inside the padding in order to accommodate a motor-driven pump or a valve for supply of lumbar-supporting air, a motor-driven vibrator or an adjuster mechanism.

DESCRIPTION OF THE PREFERRED EMBODIMENTS

Figure 1:
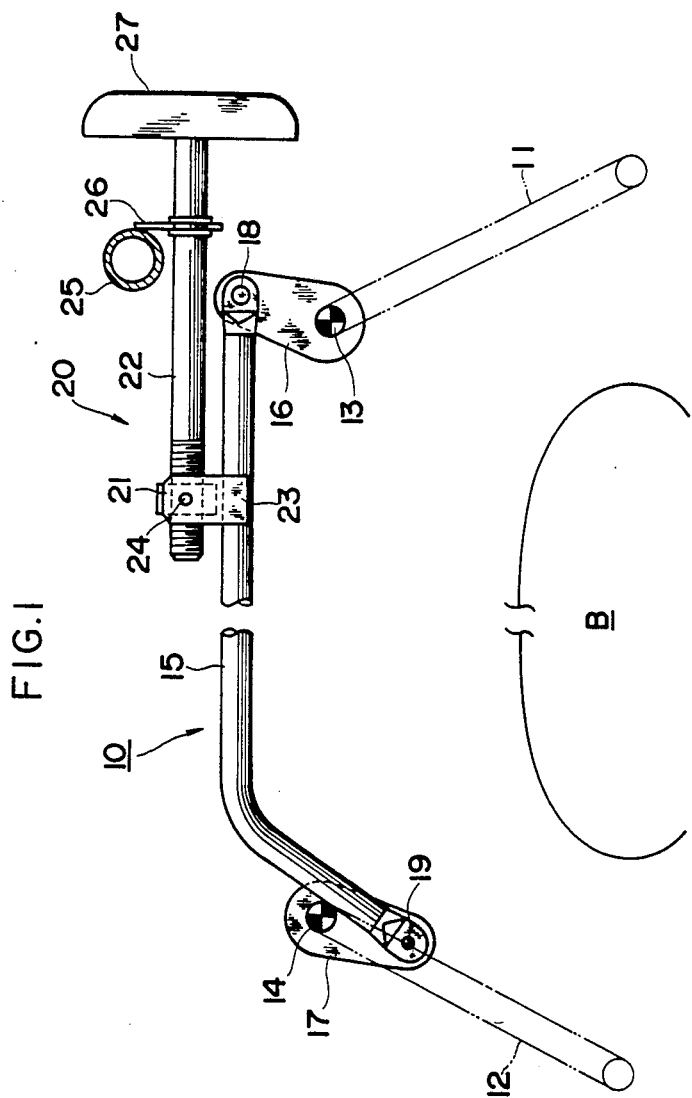
FIG. 1 is a plan view illustrating a first embodiment of a side suport assembly according to the present invention.

Turning now to the drawings and referring first particularly to FIG. 1, a first embodiment of a side support assembly according to the present invention and indicated generally by the reference numeral 10 includes frames 11, 12 on the right and left sides of a seat (or seated body) B, each frame constituting the structural framework of a side support. The frames 11, 12 have freely rotatable operating shafts 13, 14 disposed vertically of the seat B at the right and left sides of the seat. A transversely extending connecting rod 15 for rotating the operating shafts 13, 14 back and forth is provided in a backrest portion, not shown, and is coupled to the operating shafts 13, 14 by respective links 16, 17 in such a manner that the left and right side supports may be swung toward or away from each other horizontally. The right end of connecting rod 15 is connected to the right link 16 by a pin 18 in back of the operating shaft 13 so as to be freely rotatable. The left end portion of connecting rod 15 is bent to positon its distal end in front of the left operating rod 14 and has this end freely rotatably connected to the left link 17 by a pin 19. The links 16, 17 are fixedly secured to the respective operating shafts 13, 14. The shafts 13, 14 of the left and right frames 11, 12 are pivotally secured on the backrest frame through known means (not shown in the Drawings).

Swinging means serving also as a locking mechanism and indicated generally by the reference numeral 20 comprises a nut 21 and a screw shaft 22 threadedly engaged therewith. A bracket 23 is fixedly secured to the connecting rod 15 at a suitable position, and a nut 21 is pivotally supported thereon by a pin 24 so that the connecting rod 15 is allowed to tilt by being moved to the left or right. The position at which the nut 21 is attached preferably is at the central portion of the connecting rod 15 if design considerations so allow. The screw shaft 22 is disposed generally parallel to the connecting rod 15 and extends from the position at which it is threadedly engaged with the nut 21 to the right side support beyond a backrest frame 25. The screw shaft 22 is rotatably supported at a point along its length by a bracket 26 fixedly secured to the backrest frame 25. The end of the screw shaft 22 opposite the nut 21 is provided with a handle 27 to make it easier to rotate the screw shaft. It is also possible to rotate the screw shaft 22 by a motor used in place of the handle 27, although this arrangement is not shown.

When the connecting rod 15 is moved to the left in FIG. 1 by rotating the screw shaft 22, the operating shaft 13 on the right side is rotated counter-clockwise by the link 16 and the operating shaft 14 on the left side is rotated clockwise by the link 17 simultaneously, whereby the left and right frames 11, 12 secured to the respective operating shafts 13, 14 are swung away from each other. Conversely, when the connecting rod 15 is moved to the right in FIG. 1 by rotating the screw shaft 22, the operating shaft 13 on the right side is rotated clockwise by the link 16 and the operating shaft 14 on the left side is rotated counter-clockwise by the link 17 simultaneously, whereby the left and right frames 11, 12 are swung toward each other. Turning the handle 27 the proper amount and in the proper direction allows the left and right frames 11, 12 to thus be set at positions conforming to the figure of the seated individual.

After the frames 11, 12 have been positionally adjusted as set forth above, the swinging means 20 acts as a locking mechanism. More specifically, when the inertial force of the seated individual acts on, say, the right frame 11, a counter-clockwise rotating moment is developed in the link 16, as a result of which a force is produced that attempts to move the connecting rod 15 to the left. However, since this does not subject the nut 21 to a torque that can rotate the screw shaft 22, the connecting rod 15 is incapable of moving leftward. The result is the same if the inertial force acts upon the left frame 12. Accordingly, after the frames have been positionally adjusted, the swinging means 20 functions to lock the frames in position.

Figure 2:
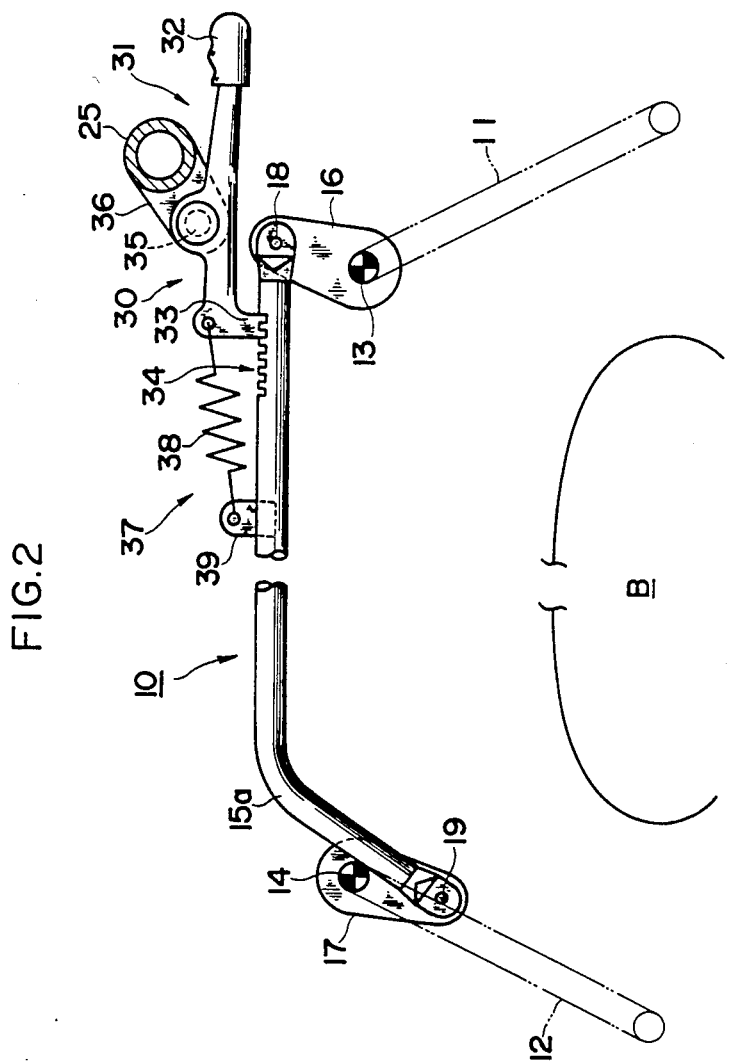
FIG. 2 is a plan view illustrating a second embodiment of a side support assembly according to the present invention.

FIG. 2 illustrates a second embodiment of a side support assembly according to the present invention. Portions other than the swinging means and locking mechanism are identical with those of the first embodiment and need not be described again.

The locking mechanism in this embodiment of the invention is indicated at reference numeral 30 and includes a latch lever 31 having a grip portion 32 at one end and a pawl portion 33 at the end opposite the grip portion. The connecting rod, here shown at 15a, is formed to include a number of teeth 34 at a portion thereof corresponding to the pawl portion 33, the arrangement being such that the pawl may be brought into engagement with any one of the teeth 34. The central portion of the latch lever 31 is pivotally mounted on a projection 36 of the backrest frame 25 via a pin 35 in such a manner that the lever 31 is capable of rotation about the frame 25. In order to balance the rigidity (resistance) of the frames 11, 12, the position of the teeth 34 preferably is as close to the center of the connecting rod 15a as possible.

The swinging means, here shown at reference numeral 37, includes a spring 38 having one end fastened to a bracket 39 provided on the connecting rod 15a at a suitable location. The other end of the spring 38 is fastened to the pawl portion 33 of the latch lever 31. The spring 38 is provided with enough tension to swing the side frames 11, 12 and is biased sufficiently to urge the pawl portion 33 of the latch lever 31 into the teeth 34.

In operation, an individual who wishes to sit down in the seat B pulls the grip portion 32 of the latch lever 31 forward to cause the pawl portion 33 to disengage from the teeth 34 of the connecting rod 15a. While still pulling the lever 31 forward, the individual swings either of the frames 11, 12 away from the seat by applying pressure thereto, thereby forcing both frames away from the seat via the connecting rod 15a. Next, the individual sits down in the seat B and releases the frames 11, 12, whereupon the connecting rod 15a is moved rightward owing to the tension in spring 38. When this occurs, the right link 16 rotates clockwise and the left link 17 counter-clockwise, thereby moving the left and right frames 11, 12 toward each other. The individual releases the grip portion 32 when the side frames 11, 12 have been set to the appropriate position, whereupon the pawl portion 33 is brought into engagement with one of the teeth of connecting rod 15a by the biasing force of spring 38. The connecting rod 15a is thus locked against movement.

As many apparently widely different embodiments of the present invention can be made without departing from the spirit and scope thereof, it is to be understood that the invention is not limited to the specific embodiments thereof except as defined in the appended claims.

What is claimed is:

1. An occupant side support assembly for a seat having a backrest, comprising:
    left and right frames horizontally swingable and provided on the left and right sides of the backrest, each frame constituting a side support framework;
    connecting rod means provided on the backrest and extending transversely thereof for swinging said left and right frames toward and away from each other; and
    a locking mechanism provided on said connecting rod for simultaneously locking said left and right frames at a position to which they have been set.

2. The side support assembly according to claim 1, wherein said locking mechanism comprises:
    a screw shaft rotatably mounted on the backrest;
    a nut threadedly engaged with said screw shaft; and
    means for securing said nut to said connecting rod.

3. The side support assembly according to claim 2, wherein said means for securing said nut is a bracket secured to said connecting rod to allow a pivotal movement with respect to said nut.

4. The side support assembly according to claim 3, wherein said bracket is fixedly secured to said connecting rod and pivotally supporting said nut.

5. The side support assembly according to claim 2, wherein said locking mechanism further comprises means for rotating said screw shaft to thereby move said connecting rod, whereby said left and right frames are set to a desired position.

6. The side support assembly according to claim 1, wherein said locking mechanism comprises:
    a latch lever having a pawl portion at one end thereof;
    teeth formed in said connecting rod at a location corresponding to the pawl portion of said latch lever; and
    means for engaging said pawl portion with said teeth for locking said connecting rod against relative movement therebetween.

7. The side support assembly according to claim 6, wherein said engaging means comprises biasing means for biasing said left and right frames towards each other.

8. The side support assembly according to claim 7, wherein said biasing means is disposed between said connecting rod and said engaging means.

9. The side support assembly according to claim 6, wherein said latch lever is pivotally secured in operative connection with said backrest.

* * * * *